May 3, 1955 — C. D. TRIPP ET AL — 2,707,507
WELD NUT
Filed Feb. 6, 1950
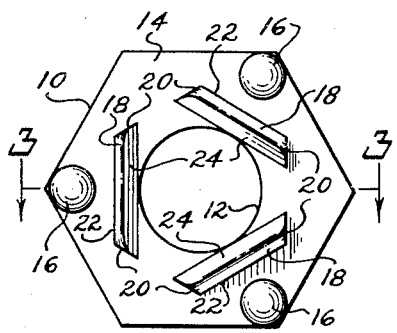
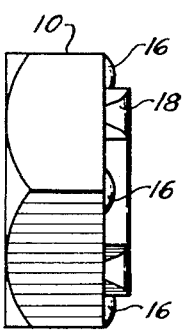
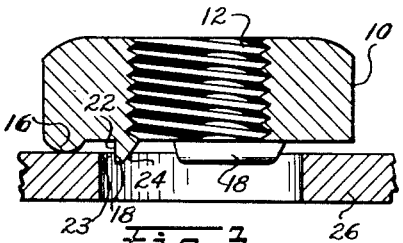
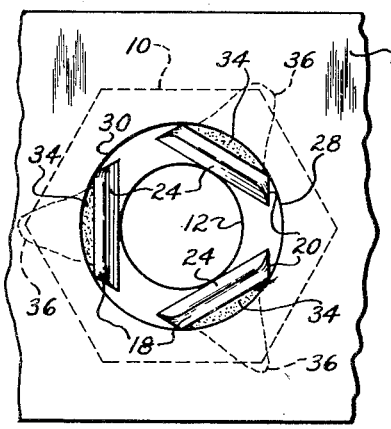
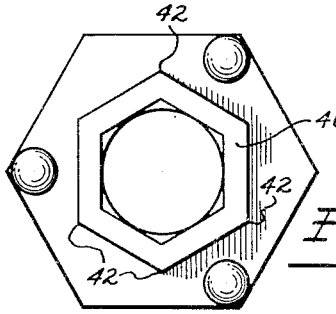
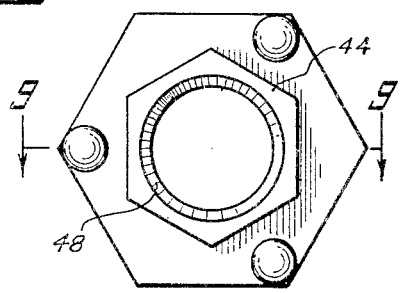
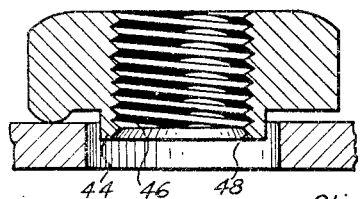
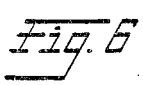
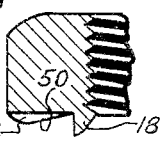
INVENTOR
Chester D. Tripp
Lawrence W. Kass
By Strauch, Nolan + Diggins
ATTORNEYS

United States Patent Office 2,707,507
Patented May 3, 1955

2,707,507

WELD NUT

Chester D. Tripp and Lawrence W. Kass, Chicago, Ill., assignors to Grip Nut Company, South Whitley, Ind., a corporation of Illinois Application February 6, 1950, Serial No. 142,581

1 Claim. (Cl. 151—41.7)

This invention relates to a weldable nut adapted to be permanently welded to a perforated metal plate to receive and locate the threaded end of a securing bolt for other parts where, owing to space limitations the application of the standard type of nut to the bolt is not possible or can be accomplished only with great difficulty. Among other uses of such weldable nuts they have been effectively employed for immovably securing machines in shipping crates, to adjustably secure supporting legs to machines, for the attachment of hanger members or other parts to vehicle frames, and for analogous purposes.

It is the general object and purpose of the present invention to provide certain important improvements in a weldable nut of the piloted type disclosed in application Serial No. 97,028, filed by myself and Lawrence W. Kass on June 3, 1949, whereby the nut may be easily, quickly and securely welded to a perforated metal plate with its threaded bore in accurate axially centered relation to the perforation in said plate and the welded end face of the nut in exact parallelism with the surface of the plate, and if desired, in positive contact therewith throughout its area around the perforation by predetermining the relative size of the welding projections and the welding pressures and temperatures.

A more particular object of the invention resides in the provision of welding projections formed on the bottom face of a hexagonal nut at alternate corners only of the nut body and each having substantially single point initial contact with the surface of a perforated metal plate, together with a novel arrangement of pilot rib or flange sections disposed in angular relation to each other and the nut bore and of greater height than the welding projections to freely extend into the perforation of the plate and cooperate with the wall thereof to effectively center the nut with respect to the perforation yet permit precise parallelism between the opposed surfaces of the plate and welding projections during the initial set up of parts as well as during application of the welding heat and pressure to the nut.

A further object of the invention is the provision of a nut having readily controllable welding projections so shaped and arranged as to provide maximum efficiency.

A more specific object in one embodiment of the invention resides in a novel relative location or arrangement of the welding projections and angularly related pilot ribs on the end face of the nut body so that when the ribs are inserted into a circular opening in the metal plate the outer side faces thereof are spaced from the wall of said opening and a part of the welding flash metal flows into said spaces where if desired, it integrally joins the respective ribs to the plate, each rib contacting the metal plate only at its opposite ends so that loss of electrical energy by short circuiting the current during the welding operation will be reduced to a minimum. Also by the relative angular arrangement of the piloting ribs, a series of nuts may be welded to a plate provided with hexagonal openings or apertures, with said nuts accurately centered with respect to the openings and oriented to the same positions, without employing a jig for this purpose.

An additional object of the invention is to provide a weldable nut having the novel features above described without increasing the production cost of this type of nut and which can be expeditiously produced in conventional nut makers by forming tools and dies and cold swaging operations.

With the above and other objects in view, the invention comprises the improved weldable nut and the construction and relative arrangement of the several parts, as will hereinafter be more fully described, illustrated in the accompanying drawings and subsequently incorporated in the subjoined claims.

In the drawings, wherein I have disclosed several simple and practical embodiments of the invention:

Figure 1 is a bottom plan view illustrating one commercial form of my improved weldable nut;

Figure 2 is a side elevation thereof;

Figure 3 is a sectional view, substantially on the line 3—3 of Figure 1, showing the nut in its initially applied position on the perforated metal plate;

Figure 4 is a similar view showing the nut in its final welded position with respect to the plate;

Figure 5 is a plan view of the nut in its welded position upon a plate having a circular opening or aperture;

Figure 6 is a similar view showing the weldable nut applied to a plate having a hexagonal opening or aperture;

Figure 7 is a plan view similar to Figure 1 showing a slightly modified form of the piloting means of the nut;

Figure 8 is a bottom plan view illustrating a further modification;

Figure 9 is a sectional view taken substantially on the line 9—9 of Figure 8; and Figure 10 is a fragmentary sectional view illustrating a slightly modified form of the welding projections.

Referring first to the embodiment of the invention illustrated in Figures 1 to 5 of the drawings, we have shown a nut body 10 of a hexagonal form having a tapped or threaded bore 12. Upon one end face 14 of the nut body substantially hemispherical or dome-shaped welding projections 16 are formed. Pursuant to this invention only three of these welding projections are provided, each located at one end of a major diameter of the nut body, or at alternate corners thereof, said projections at the nut face 14 being substantially tangential to adjacent flat side surfaces of the nut body. By the provision of only three hemi-spherical welding projections perfect three point contact of the projections with the plate is assured, whereas with a greater number of projections such positive and uniform contact of the projections can neither be made nor maintained. As a result of this three point contact, uniform flow of current is assured through each projection at all times with the result that substantially perfect utilization of the predetermined amount of welding metal of each projection is assured, sputtering and excessive flash due to arcing between the plate and a non-contacting projection is eliminated, and insecure attachment of the nut to the plate due to a poor weld between the plate and non-contacting projections is avoided.

Three piloting ribs 18 are also integrally formed with the nut body and project from the end face 14 thereof to a greater height than the welding projections, as seen in Figures 3 and 4 of the drawings. Each of these ribs has its lengthwise dimension disposed substantially at right angles to a radial plane bisecting one of the welding projections 16, the oppositely beveled end faces 20 of the rib being equidistantly spaced from said plane, while the outer side face 22 of the rib is disposed in a plane substantially parallel to the nut axis and radially spaced inwardly from the welding projection 16 and the wall of the perforation except at its outer corners. The inner side face 24 of each rib is inwardly inclined and at the nut face 14 is in substantially tangential relation to the threaded nut bore 12. It will thus be seen that the three piloting ribs 18 define alternate sides of a hexagonal figure with the beveled ends 20 of adjacent ribs spaced apart about the nut bore 12 and defining angularly spaced pockets 23 (Figure 3) for receiving inwardly flowing welding flash.

The length of the piloting ribs 18 and the spacing between these ribs and the welding projection 16 is predetermined with relation to the size or diameter of the aperture or opening in the metal plate to which the nut is to be welded. In Figure 5 of the drawings I have shown a metal plate 26 provided with a circular opening 28. When the nut is arranged in its initial position on one side of the plate 26, the three piloting ribs 18 first enter the opening 28 with the beveled end faces 20 of said ribs in minimum clearance relation at circumferentially spaced points to the wall of the opening 28, as indicated at 30 in Figure 5. Each welding projection 16 then has a single point of bearing contact on the surface of the plate 26 in radially spaced relation to the opening 28, and by reason of the chordal relationship of the ribs 18 to the wall of said opening, the welding flash receiving space 23 is provided between said wall and the outer side face 22 of each rib 18.

Upon reference to Figure 5 it will be readily seen that the relative arrangement of the contact points of welding projections 16 and piloting ribs 18 with plate 26 assures the maintenance of an accurate coaxial relation between the threaded bore 12 and the opening 28 in the plate 26, during the welding operation. With the nut in its initially assembled position on the plate 26 as seen in Figure 3, the stationary and movable welding electrodes are then applied, the movable electrode forcing the nut under pressure toward the plate 26 as the electric heating current passes through the nut body and the welding projections 16. The conventional method of resistance welding results in the concurrent application of heat and pressure to the projections 16 on the nut face, the electric current being of sufficient amperage and maintained for the necessary time to pass through the nut body and heat the projections 16 and the surface portion of the plate 26 contacted thereby to a cherry red color, whereupon said projections and the surface portion of the plate are molecularly fused together.

In this welding operation the angularly related piloting ribs 18, due to the relation between their ends and the wall of the opening 28 in plate 26 maintain parallelism between the axis of the nut and opening 28 until intimate contact is established between the nut face and the opposed surface portion of the plate 26 throughout its area. The excess welding flash from the projections 16 flows radially inward and into the spaces 23 between the piloting ribs and the wall of opening 28 in the plate and retains sufficient heat to form, in effect, an integral connecting joint 34 between the outer face 22 of each rib and the opposed wall surface section of opening 28 in the plate. A minor portion of the welding flash will also protrude outwardly on the surface of plate 26 beyond the corner of the nut as indicated at 36. Since in the reduction of the welding projections 16 to a semi fluid condition by the electric current, only a minor portion of each pilot rib 18 at its ends is an electrically conductive contact with the plate 26 detrimental short circuiting of the current is reduced to a minimum, resulting in appreciable economy in the consumption of electrical energy.

Thus, my present improvements, as above described, provide a piloted type of nut having means whereby the nut may be easily, quickly and securely welded to the plate 26, with its threaded bore in exact axial parallelism to the opening in the plate, and against either rotative, axial or lateral displacement with respect to said opening. The inclined inner surfaces 24 of the pilot ribs 18 provide means for directing and accurately centering an attaching bolt in the end of the nut bore for easy and quick starting of the threaded connection.

As above described the nut may be piloted by the ribs 18 in a circular opening 28 of the metal plate with the side faces of the hexagonal nut body disposed in any desired angular relationship to the longitudinal edges of the plate. However, by providing the plate 26 with hexagonal openings or apertures, as indicated at 38 of Figure 6 of the drawings, a series of nuts may be easily and quickly oriented to the same position on the plate 26 in axial parallelism to the openings 38 and then welded to said plate in the manner above described.

In this case the pilot ribs 18 have substantial contact throughout their outer side faces with opposite edge walls of the hexagonal opening 38 in the plate 26 so that the flash receiving spaces 32 above referred to are not present and the greater part of the welding flash will flow between the nut face 14 and the plate 26 lengthwise of the pilot rib in opposite directions from the point of initial contact of projection 16 with plate 26. However, in both cases it will be seen that the pilot ribs 18 serve as effective barriers to inward flow of the welding flash to the bore 12 and resultant fouling of the nut thread. Further, it will be seen that owing to the angular relation of the pilot flanges 18 to each other and the axis of the nut, and their points of contact with the wall of the opening 28 or 38 with respect to the location of the initial points of welding contact between the projections 16 and plate 26 at the extreme ends of longer diameters of the nut body, the tendency of torque stresses resulting from bolt application to rupture the welded connections between the face 14 of the nut and the plate 26 will be minimized.

In Figure 7 of the drawing a modification is shown in which instead of the spaced pilot ribs 18 a continuous pilot flange or boss 40 is formed on the end face 14 of the nut having an internal and external hexagonal shape. The several angularly related parts form an outer hexagonal guide section and the inner surfaces form a bolt guiding recess. In this case, when the flange 40 is inserted into cylindrical opening 28 of the plate 26 to position the nut with respect thereto, only the six external corners 42 of said flange will have contact with the wall of said opening, thus further reducing the area of electrically conductive contact between the pilot means and the plate to which the nut is welded to an absolute minimum. When a nut of this construction is applied to a plate having a hexagonal opening therein, each edge wall of the opening will be contacted by one of the angularly related sections of the pilot flange or boss 40. The arrangement of the welding projections 16 on the end face of the nut with respect to alternate sections of the flange 40 is the same as the relative arrangement of the welding projections with respect to the pilot ribs 18 of the first described embodiment of the invention.

In Figures 8 and 9 of the drawings a further alternative embodiment of the invention is shown which has all of the advantages of the constructions shown in Figures 1 and 7, in making the welded connection between the nut and a metal plate having either a circular or hexagonal opening or aperture. In this case, the piloting boss or flange 44 has an external hexagonal contour but is of internal cylindrical form and provided with threads 46 in continuation of the threads of the tapped bore 12 of the nut body. The end of the pilot boss 44 is also provided with an internal chamfer 48 to direct and center the bolt end for starting engagement with the threads 46.

In Figure 9 the nut is shown in its initially applied position on a metal plate having a circular opening or aperture, and its final position, when welded to the plate in the manner above described, is substantially the same as that illustrated in Figure 4 of the drawings.

In Figure 10, a modified form of the welding projection on the end face of the nut body is shown, in which the point of contact of the convex surface of the projection 50 with the surface of the plate 26 is located at a maximum radial distance from the adjacent side face of the piloting flange 18, and nearer to the corner of the nut body than in the previously described form of the invention, as indicated at 52. From this point of maximum height of the projection from the end face 14 of the nut body, the welding projection slopes or inclines inwardly to the end face of the nut body approximately at the juncture of the outer side face of the pilot rib 18 therewith. This form of the welding projection insures a minimum of externally protruding welding flash with the major flow of metal inward and circumferentially over a greater area between the end face 14 of the nut body and the opposed surface of the plate 26.

From the foregoing description, the construction and several advantages of the disclosed embodiments of the invention may be clearly understood, and it will be seen that I have provided an improved construction and relative arrangement of the pilot means and welding projections on the end face of the nut which may be readily proportioned to permit full engagement of the nut and plate surfaces after welding, and provide nuts which may be rapidly and accurately assembled upon perforated metal plates for resistance welding thereto, and in which the axial relation between the nut bore and the perforation of the metal plate will be maintained during the welding operation. The invention also provides a novel pilot means for the nut having spaced parts contacting the wall of the opening or perforation in the plate at points remotely spaced from the welding projections, so that rotation of the nut under torque stresses when the bolt is threaded into the nut bore, tending to disrupt or break the welded connections, as would occur in the use of the usual annular or cylindrical pilot flange, is effectively prevented.

Since, in Figure 5 of the drawings the pilot ribs are joined by the weld flash 34 to the wall of the opening in the plate 26, and in Figure 6 each rib has contact throughout its length with one of the edge portions of the hexagonal opening in said plate, forces acting on the bolt at an angle to its axis cannot angularly displace the bolt and nut relative to the plate 26 so that the bolt axis will, under all conditions of use, be maintained in a position normal to the plane of the plate 26.

In each of the above described embodiments of the invention, I have shown my present improvements as applied to nuts of hexagonal form. A similar arrangement of the pilot ribs or boss and welding projections may also be provided on connecting members of other polygonal forms, or of cylindrical form and having either a threaded bore or a plain cylindrical bore through which the bolt or other attaching element for the part to be connected to plate 26 may be inserted. In each of the illustrated examples of the invention, the nut or other connecting member is formed from cold drawn steel having a metallurgical structure substantially corresponding to that of the perforated plate to which said member is to be welded. These members may be rapidly fabricated in well known nut making machines in which the several parts are accurately formed as to their relative location and predetermined dimensions.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by the United States Letters Patent is:

A hexagonal nut having a tapped bore and provided with means for forming a welded joint between an end face of the nut and a perforated metal plate, with the nut bore in accurate coaxial relation with a perforation in said plate, said means comprising spaced welding projections on said end face of said nut body respectively located on alternate corners of the nut body and at one extreme end of each major diameter of the nut body, and three piloting ribs on said end face of the nut body positioned between said bore and one of said projections in substantially tangential relation to the bore thereof and each having a lengthwise dimension extending equidistantly from and at substantially right angles to a radial plane bisecting one of said welding projections, said ribs being inwardly spaced from said projections and projecting axially from the nut body for a greater distance than said projections, the ends of adjacent ribs being spaced apart to contact the wall of a circular perforation in the metal plate, with said projections in contact with the surface of said plate, to maintain parallelism between the opposed surfaces of the nut and plate during the welding operation, the outer side faces of said ribs being spaced from the wall of the perforation to provide spaces receiving welding flash from said projections to integrally unite said piloting ribs with the metal plate.

References Cited in the file of this patent
UNITED STATES PATENTS

| Number | Name | Date |
|---|---|---|
| 1,360,815 | Suttill | Nov. 30, 1920 |
| 1,872,616 | Andren | Aug. 16, 1932 |
| 2,042,953 | McArdle et al. | June 2, 1936 |
| 2,054,187 | Almdale | Sept. 15, 1936 |
| 2,105,139 | Demboski et al. | Jan. 11, 1938 |
| 2,167,285 | Smith | July 25, 1939 |
| 2,279,574 | Langmaid | Apr. 14, 1942 |